United States Patent
Celorio Garrido

(12) 
(10) Patent No.: US 6,268,008 B1
(45) Date of Patent: Jul. 31, 2001

(54) COMPOSITION OF NIXTAMILIZED MAIZE DOUGH FOR THE PRODUCTION OF MAIZE PANCAKES

(76) Inventor: Sergio Alejandro Celorio Garrido, Newton #7-401, Col. Polanco (MX), 11570

( * ) Notice: Subject to any disclaimer, the term of this patent is extended or adjusted under 35 U.S.C. 154(b) by 0 days.

(21) Appl. No.: 09/463,034

(22) PCT Filed: Jul. 13, 1998

(86) PCT No.: PCT/MX98/00033

§ 371 Date: Apr. 21, 2000

§ 102(e) Date: Apr. 21, 2000

(87) PCT Pub. No.: WO99/03361

PCT Pub. Date: Jan. 28, 1999

(30) Foreign Application Priority Data

Jul. 15, 1997 (MX) .................................... 975339

(51) Int. Cl.[7] ........................................... A23L 1/164
(52) U.S. Cl. .......................... 426/556; 426/557; 426/622; 426/653
(58) Field of Search .................. 426/556, 557, 426/622, 653

(56) References Cited

U.S. PATENT DOCUMENTS

| 5,298,274 | * | 3/1994 | Khalsa | 426/560 |
| 5,928,701 | * | 7/1999 | Jensen et al. | 426/560 |
| 6,025,011 | * | 2/2000 | Wilkinson et al. | 426/622 |
| 6,056,990 | * | 5/2000 | Delrue et al. | 426/622 |

FOREIGN PATENT DOCUMENTS

WO 95/01732 * 1/1995 (WO).
WO 98/18331 * 5/1998 (WO).

* cited by examiner

Primary Examiner—Nina Bhat
(74) Attorney, Agent, or Firm—Intellectual Property Law Group, LLP; Otto O. Lee

(57) ABSTRACT

A corn paste for making tortillas is disclosed, which comprises between ten to one-hundred grams of dietary fiber in one kilogram of corn paste that provides a suitable proportion of raw fiber that can fulfill the minimum dietary fiber requirements of the human body and with the appropriate organoleptic attributes, as well as commercially adequate minimum shelf life.

9 Claims, No Drawings

COMPOSITION OF NIXTAMILIZED MAIZE DOUGH FOR THE PRODUCTION OF MAIZE PANCAKES

This application claims benefit under 35 U.S. 371 of PCT/MX98/00033, filed Jul. 13, 1998.

BACKGROUND OF THE INVENTION

It is well known that the consumption of fiber in the diet is beneficial to human health. Since this discovery, the number of products containing large amounts of fiber has increased, and products with 100% fiber have been commonly made.

From the point of view of digestion, dietary fiber stimulates the peristaltic movements of the digestive tract and improving the displacement through the tract. Also, fiber has the attribute of absorbing fat and reducing its assimilation.

There are several products on the market that an individual can use to increase one's intake of dietary fiber. These products are available in the form of pills, powder, and tablets. There are also several breakfast cereals on the market that contain a significant amount of raw fiber. Of what is known about the digestive process of the human body and the functioning of the organs, it is known of the need of raw fiber being present in the bolus to assure its presence in chyme. It is in the small and large intestines that dietary fiber predominantly accomplishes its action.

Pills and tablets consumed in that way are not quite convenient, since after taking them, fiber will be present only in a small part of the bolus and therefore, just in a reduced fraction of chyme.

The consumption of the high fiber breakfast cereals would be most beneficial if the cereal was consumed in small portions periodically throughout the day with each meal. However this is not possible because of the organoleptic attributes of such cereals.

The solution to introducing raw fiber in every consumed aliment was to include fiber in an aliment which could be easily consumed with soup as well as with stew. The outcome of this reasoning is to choose tortilla as a support or incipient of raw fiber.

The manufacturing process of "tortillas" has been known since the ancient Mayas times. There are mainly three stages to tortilla manufacturing: (1) The "nixtamalization" (to obtain the "nixtamal"), (2) the grinding of the nixtamal (to obtain the paste), and (3) the manufacture of the "tortilla" (using the paste).

Each of the three manufacturing stages has had their own technical progress as to the different elements being used in them, but one of the nutrimental characteristics of corn was what strongly attracted the attention of the studious: The lack of lysine and tryptophane in the main protein existing in corn: Zein.

Even though the "nixtamalization" stages improves the proportions of the different aminoacids in corn proteins, the nutritional problem was still there, several investigations were performed to test the addition of different substances rich in protein to the paste of "maiz nixtamalizado". The substances tested were, sesame seed and fish powder, among others. The conclusion from the studies was unanimous: corn paste does not allow the addition of any of the tested substances without altering the organoleptic attributes of the tortillas.

From the first experiments, it could also be concluded that paste also changes its organoleptic attributes when dietary fiber is added to it, just as it happens with the previously mentioned powders.

The main changes concerned the mechanical attributes of the "tortilla": The tortillas were less flexible (they tore when making a "taco"), and too impermeable (the tortillas fell into pieces when cooking certain dishes such as "enchiladas"), and of the paste: The corn paste lost its flexibility (or gum-like body) when dietary fiber was added.

Another important characteristic of the "tortilla" is its shelf life. High fiber tortillas must have a shelf life of about one week to be practical which can only be accomplished by using preservatives.

The "tortillas" that are presently commercially available contain preservatives that cause the product to taste and smell unpleasant, having also the disadvantage of tortillas breaking easily, being very permeable and having an unpleasant appearance.

OBJECTIVES OF THE INVENTION

The main objective of this invention is to provide a means that can be used in every meal and with a majority of the dishes to supply dietary fiber to the human body. A second objective of the invention is to provide a corn paste ("nixtamilizado") to make high fiber "tortillas" that would have a suitable proportion of raw fiber that can fulfill the minimum dietary fiber requirements of the human body and with the appropriate organoleptic attributes of color, smell, taste and mechanical qualities that would allow the tortilla to be used in its use in cooking such items as "tacos" or "enchiladas". Another objective is to create an adequate combination of a corn paste, which can be used to manufacture tortillas with the aforementioned attributes and also have a minimum shelf life of 7 days.

An additional objective is to produce a corn paste ("nixtamalizado") that permits the manufacture of a "tortilla" which after being reheated maintains its original organoleptic characteristics.

DESCRIPTION OF THE INVENTION

After finding out that eating "tortillas" is an excellent means to provide the human body with the recommended daily allowance of dietary fiber, there still existed a problem: The negative effects that is produced that result from the addition of the fiber in making the tortillas.

After many experiments, an unexpected solution was found: We discovered that the solution was to combine an appropriate proportion of dietary fiber with an appropriate combination of dietary fiber with the soluble and insoluble alimentary fibers which did not change unfavorably the attributes of taste, smell and appearance, and did favorably change the mechanical qualities of the resulting "tortilla" and intervened in an important way in increasing its shelf life.

With a low concentration dietary fiber being included in the paste, the recommended daily allowance of fiber for human body was not reached, taking into account the amount of "tortilla" that an individual consumes. The amount of raw fiber (dietary fiber) was increased excessively, the resulting "tortillas" made out of this paste were too firm (with leather-like consistency).

If the fiber used in the paste contained an excess of insoluble alimentary fiber, the resulting "tortillas" lost water very quickly, broke easily, and were too permeable, falling into pieces when used in cooking dishes such as "enchiladas". The paste would not be flexible enough, which made the manufacture of "tortillas" very difficult.

If the fiber combination used in the paste contained an excess of soluble fiber, the resulting paste was very flexible, gum-like and sticky, and was therefore inappropriate for the manufacture of "tortillas". The resulting "tortillas" became leather-like within a very short time of being stored, and caused an unpleasant sensation when consumed.

We discovered that the best combination of fiber was achieved when each kg. of improved paste contained, between 10 and 100 gr. of fiber. In a chosen preferred embodiment, the amount of dietary fiber in the paste was between 60 and 70 gr. for each kg.

The proportion of soluble and insoluble fiber in the combination of corn paste was altered in such a way that the resulting "tortilla" had between 30%–45% of soluble fiber and 55–70% of insoluble fiber. This combination provided the maximum amount of fiber to the diet and kept the desirable qualities of the resulting "tortilla". The chosen proportion in the combination of fiber corn paste was such, that the resulting "tortilla" contained 40% of soluble fiber and 60% of insoluble fiber.

The undesirable taste and smells caused by the use of preservatives were avoided by using fumaric and propionic acid salts instead of using the acids themselves.

These salts increased the shelf life of the tortillas without causing an undesirable taste or smell.

EXPERIMENTATION

EXAMPLE 1

We used 990 gr. of corn paste, added 10 gr. of dietary fiber with which resulted in the fiber of the tortilla consisting of 40% soluble fiber and 60% of insoluble fiber in the fiber element of the resulting tortilla. To the above combination, we added 8 gr. of preservatives which consist of propionic acid and fumaric acid salts; 1.5 gr. of carboximethyl-cellulose and 2.5 gr. of citric acid. The results were acceptable as to shelf life and organoleptic attributes.

EXAMPLE 2

We used took 960 gr. of corn paste, and we added 40 gr. of dietary fiber with resulted in the fiber descend or the tortilla consisting of 40% soluble fiber and 60% of insoluble fiber. To the elements above, we added 8 gr. of preservatives, which consisted of propionic acid and fumaric acid salts, 1.5 gr. of carboximethyl-cellulose, and 2.5 gr. of citric acid. The obtained results were acceptable with regard to shelf life and organoleptic attributes.

EXAMPLE 3

We took 935 gr. of corn paste and we added 65 gr. of dietary fiber which resulted in the fiber element of the tortilla consisting of 40% soluble fiber and 60% of insoluble fiber. To the above, we added 8 gr. of preservatives which consisted propionic and fumaric acid salts, 1.5 gr. of carboximethyl-cellulose, and 2.5 gr. of citric acid. The results were acceptable with regard to shelf life and organoleptic attributes.

EXAMPLE 4

We used 900 gr. of corn paste and added 100 gr. of dietary fiber which resulted in the fiber element of the tortilla consisting of 40% soluble fiber and 60% of insoluble fiber. To the above, we added 8 gr. of preservatives which consisted propionic and furmaric acid salts, 1.5 gr. of carboxymethyl-cellulose, and 2.5 gr. of citric acid. The results were acceptable with regard to shelf life and organoleptic attributes. However this "tortilla" had a tendency to get hard.

The best fiber combination was the one described in Example 3, since it provided (1) the recommended daily amount of dietary fiber with a very small portion of "tortilla", (2) the best product quality with regard to appearance, taste, smell, and with a long shelf life.

What is claimed is:

1. A corn paste for making tortillas comprising 65 grams of dietary fiber in one kilogram of corn paste, wherein said dietary fiber further comprises between 30 to 50 percent of soluble dietary fiber and between 55 to 70 percent of insoluble dietary fiber.

2. The corn paste in claim 1 in which the dietary fiber comprises 40 percent soluble dietary fiber and 60 percent insoluble dietary fiber.

3. The corn paste in claim 2 further comprising 8 grams of preservatives in one kilogram of corn paste, the 8 grams of preservatives comprising propionic, fumaric acid salts, 1.5 gram of carboxymethyl-cellulose and 2.6 gram of citric acid.

4. The corn paste in claim 2 further comprising 8 grams of preservatives in one kilogram of corn paste, the 8 grams of preservatives comprising propionic, fumaric acid salts, 1.5 gram of carboxymethyl-cellulose, and 2.5 grams of citric acid.

5. The corn paste in claim 1 further comprising 8 grams of preservatives in one kilogram of corn paste, the 8 grams of preservatives comprising propionic, fumaric acid salts, 1.5 gram of carboxymethyl-cellulose, and 2.6 grams of citric acid.

6. The corn paste in claim 1 further comprising 8 grams of preservatives in one kilogram of corn paste, the 8 grams of preservatives comprising propionic, fumaric acid salts, 1.5 gram of carboxymethyl-cellulose, and 2.5 grams of citric acid.

7. A corn paste for making tortillas comprising between 10 and 100 grams of dietary fiber in one kilogram of corn paste wherein said dietary fiber further comprises between 30 to 50 percent of soluble dietary fiber and between 55 to 70 percent of insoluble dietary fiber.

8. The corn paste in claim 7 further comprising 8 grams of preservatives in one kilogram of corn paste. the 8 grams of preservatives comprising propionic, fumaric acid salts, 1.5 gram of carboxymethyl-cellulose, and 2.5 grams of citric acid.

9. The corn paste in claim 7 further comprising 8 grams of preservatives in one kilogram of corn paste, the 8 grams of preservatives comprising propionic, fumaric acid salts, 1.5 gram of carboxymethyl-cellulose, and 2.6 grams of citric acid.

* * * * *